United States Patent [19]

Loughry et al.

[11] 4,257,063

[45] Mar. 17, 1981

[54] VIDEO MONITORING SYSTEM AND METHOD

[75] Inventors: H. Hampton Loughry, Hudson; Abraham Zeewy, University Heights, both of Ohio

[73] Assignee: Ham Industries, Inc., Macedonia, Ohio

[21] Appl. No.: 23,032

[22] Filed: Mar. 23, 1979

[51] Int. Cl.³ .................... H04N 7/18

[52] U.S. Cl. .................... 358/108; 358/105; 340/529; 340/715

[58] Field of Search .................... 358/108, 105; 340/529, 340/715

[56] References Cited

U.S. PATENT DOCUMENTS

| | | | |
|---|---|---|---|
| 3,683,111 | 8/1972 | Southworth | 358/105 |
| 3,743,768 | 7/1973 | Copland | 358/108 |
| 3,816,648 | 6/1974 | Noll | 358/105 |
| 3,825,676 | 7/1974 | Ramsden | 358/105 |
| 3,828,125 | 8/1974 | Fagan | 358/105 |
| 3,836,710 | 9/1974 | Takahashi | 358/105 |
| 3,979,740 | 9/1976 | Forbat | 340/529 |
| 3,988,533 | 10/1976 | Mick | 358/105 |

*Primary Examiner*—Howard W. Britton
*Attorney, Agent, or Firm*—Watts, Hoffman, Fisher & Heinke Co.

[57] ABSTRACT

A television system and method are disclosed for monitoring and indicating changes in a scene from which electromagnetic radiation, such as visible light, emanates. A television system including a television camera scans the scene in known raster fashion in a series of image frames, producing an amplitude modulated video signal describing the energy intensity distribution of the scene. Clocking and gating circuitry triggered in synchronism with television camera synchronization signals defines a set of predetermined discrete spaced locations of the raster during each image frame and samples video signal amplitude at each of the defined locations. The same discrete locations are sampled during each frame. Video selection circuitry, during a succession of sampling periods, inputs in real time a representation of each video amplitude sample to one of several storage channels of a multi-channel memory system including a multi-channel counter. The video amplitude samples are allocated among the channels as a function of their amplitude values. The collection of stored amplitude samples in the multi-channel memory system thus constitutes a profile of the amplitude distribution of the video samples made during the frame. This first amplitude profile is then stored. The scanning, allocating and counting operation is repeated. Subsequently, comparison circuitry, in response to the development of a subsequent amplitude distribution profile, corresponding to a selected later frame, actuates an alarm in response to the occurrence of a predetermined threshhold difference between (1) the earlier and (2) a succession of later developed amplitude distribution profiles. Circuitry is also provided for modifying characteristics of the threshhold difference required to trigger the alarm.

It has been found that even a single channel counter, responsive to video count samples in only a single amplitude range, can often provide enough information for a workable and inexpensive surveillance system.

23 Claims, 10 Drawing Figures

VIDEO MONITORING SYSTEM AND METHOD

BACKGROUND OF THE INVENTION

1. Field of the Invention

This invention relates to the field of video monitoring, wherein television is used to view a scene and to actuate an alarm if movement or change takes place in the light distribution emanating from the viewed scene.

2. Description of the Prior Art

Video systems having the capability of detecting motion or other change in a viewed scene have been known to have applications in security against intrusion of a viewed area, and in safety monitoring and control of industrial processes. Such systems compare information derived in a television image frame with analogous information derived during a previous frame, and trigger an alarm if the detected difference is greater than a predetermined threshhold. Such systems have included both analog and digital apparatus and circuitry.

Analog systems have been proposed which utilize the main characteristic of the video signal, which is an amplitude modulated signal, and process it in one or more of a variety of known fashions to derive the desired information from frame to frame.

While analog systems are generally characterized as being relatively fast operating, simple and inexpensive, they have been regarded as lacking flexibility and accuracy.

Partially in order to overcome these difficulties, digital systems have been proposed. Such systems typically include a television system and equipment for digitizing image frame information derived by the television. Such systems often require interfacing to a digital data processing system, such as a digital computer, for utilizing the information developed by the television system to detect changes from frame to frame.

Digital systems have generally been regarded as too complex and expensive for simple security alarm applications, and for performing simple industrial monitoring functions. The necessity to interface with a computer to compare light distribution patterns from among different image frames or to represent a sufficiently accurate image, results in digital systems being excessively costly, often well in excess of $5,000 per system.

The complexity of interfacing an analog television system with digital equipment gives rise to a relatively high degree of difficulty in maintaining effective and reliable operation of the large number of system components which must cooperate to be effective.

In one proposal for a digital system, the system compares fixed points during each video scan, storing up information about the observed points. During subsequent scans, the system compares information derived from the newly obtained points. This complex system first digitizes the video signal before sampling. Each sample is stored in a digital memory system indicating its "X" and "Y" coordinates corresponding to sample point location.

Such a system samples more than 16,000 points in each image frame. The amplitude of the video signal at each point is digitized and stored with its coordinate location information, which is also in digital form. The amplitude value of each point of a subsequent frame, after being stored, is subtracted from corresponding values in a previous frame, and the difference information for each point is also stored. Only then can the digital data processing system be used to develop information relating to image aspects such as the existence, size and speed of an intruding or moving object or person. Time and magnitude of the intrusion, along with the locations of the objects which caused it, are recorded in digital form.

According to another proposal, in another digital system, an entire image frame is scanned, and a counter counts the number of times the video level exceeds a predetermined threshhold. Such a system does not incorporate an organized sampling system as in the previously described proposal. One feature of the image could be completely overlooked because the system rejects all of the image components as to which the video signal is below the threshhold. This system suffers from the disadvantages of the previously described proposal as well, such as high expense and complexity.

The disadvantages of the prior art systems and proposals are obviated or ameliorated by the subsequently described video monitoring system which embodies the present invention. It is a general object of this invention to provide a video monitoring system which incorporates the accuracy and flexibility of a digital system, while partaking of the speed, simplicity and relatively low cost of analog systems.

SUMMARY OF THE INVENTION

An area monitoring system in accordance with the present invention includes a television system for viewing a scene of the protected area and for representing the spatial distribution of radiation, such as visible light, emanating from the scene. The television system represents the energy distribution by producing electrical signals, including analog video and pulsed synchronization signals defining a sequence of raster formated image frames describing the scene. The monitoring system also includes circuitry which is responsive to the television synchronization for effecting real time sampling of video signal values at each of a set of discrete spaced locations of a first image frame. Steering and multi-channel counting circuitry develops in real time an amplitude distribution profile of the video signal samples. The samples are stored in a memory system. Each video sample in a particular amplitude range is stored in a memory channel corresponding to that range. The system further includes circuitry for actuating the sampling and steering circuitry to repeat their operation over later image frames for the same set of discrete raster locations. Comparison circuitry produces an indication in response to the detection of a predetermined difference between amplitude distribution profiles developed in a succession of image frames.

This system thus, by sampling only a limited number of spaced discrete points in each television picture, can develop considerable useful information regarding changes between frames, simply by developing and comparing amplitude profiles corresponding to the respective frames. The design of this system recognizes that, in many television monitoring applications, extreme detail and resolution of an image are not necessary. It is recognized that the image is not intended for subjective human viewing, and that a simple analysis of limited aspects of the image is all that is necessary in many cases. This system thus can accomplish much with relatively simple and inexpensive video processing equipment. The system does not suffer from the "overkill" which is attendant in many of the complex digital systems of the prior art.

This system operates in real time, as opposed to the mode of prior digital system proposals, which must store up a great variety and quantity of information describing entire television frames, prior to performing information analysis and comparison steps on the stored information to derive useful information about the picture. The present system, on the other hand, with its real time operation, does not require interfacing to a digital computer for performing analysis. Rather, the analysis is done quickly and directly, in real time, with no need to store up location and amplitude information describing large members of points in entire frames as a prerequisite to deriving useful information about the image frames.

In accordance with a more specific aspect of this invention, circuitry can also be provided for modifying a threshhold difference in amplitude profile characteristics which is required to trigger the alarm indication. Thus, the system can be adjusted to be more or less sensitive to changes between frames. If it is desired, for example, to detect movements of only large objects, the system can be set to respond only to quite gross differences between amplitude profiles. In a security application, for instance, the system could be controllably desensitized such that it would not respond to movement of a small animal within the protected viewed area, but would be sensitive to intrusion of a larger body, such as that of a human intruder.

According to another aspect of this invention, a system for sensing changes in the distribution of energy emanating from a scene includes pickup means for converting the energy to electrical signals representing a characteristic of the emanation from the scene. Circuitry cooperatively coupled with the pickup means samples the characteristic of the energy for each of a predetermined set of discrete locations of the viewed scene. Other circuitry, during a sampling period, accumulates a count of the number of the sampled locations whose measured energy characteristic is within a predetermined range. This count is produced independently of the relative spatial positions within the scene of the sampled locations. Comparison circuitry is provided for detecting a predetermined difference between the value of the count and a predetermined reference value.

In this system, only a scalar count of locations exhibiting a predetermined range of the measured energy characteristic is made. This feature obviates the necessity for additional complex circuitry and storage means for generating and maintaining information relating to the spatial location of the points of the image which are measured. The positions of these points, in this system, are irrelevant. The system does not need coordinate information in order to perform its monitoring function. Thus, the inventive system performs efficiently without need for the expense and complexity of additional circuitry for taking image point spatial location into account. The only requirement is that the same set and number of points, wherever they are, be sampled in each frame.

In accordance with a more specific aspect of this invention, the counting circuitry comprises a multichannel counter. Associated circuitry counts the respective numbers of the sampled locations whose emanated energy characteristic lies within each of a corresponding plurality of respective ranges. Thus, the channel into which sampled information is input is dependent upon the value of the measured characteristic, e.g., video amplitude, corresponding to that sample.

In this embodiment, circuitry is also included for resetting the multiple counting channels after a first sampling period. Circuitry is also provided for storing count information derived during the first sampling period for comparison with analogous count information derived during subsequent sampling periods. Another feature of this invention is that the comparison circuitry comprises means for indicating at least a predetermined degree of change in the count accumulation, this change taking place in any one or more of a plurality of storage channels of the multi-channel counter, between the first sampling period and a subsequent sampling period.

More specifically, the system includes apparatus and circuitry for generating an audible alarm in response to the frame to frame change in the measured characteristic being greater than a predetermined threshhold value.

In accordance with an additional feature of this invention, the pickup means includes a television camera system. The television camera system is controlled by horizontal and vertical synchronization signals, and produces an analog video signal representing a characteristic of the radiation coming from the viewed scene. Clocking circuitry produces the synchronization signals, and defines the timing of a series of clocking pulses which in turn define the sampling locations of the image frame, by triggering sampling at predetermined times relative to the initiation of production of each image frame. Steering circuitry is responsive to the amplitude of the video signal at the clock-defined sampled locations to steer representations of the samples to various channels of a multi-channel analyzer. The multi-channel analyzer (a portion of a memory system) accumulates in each channel the number of samples from the frame which fall within one of a plurality of amplitude ranges. This accumulation gives a profile of the amplitude distribution of the video signals at the sampled locations during the sampling period.

The sample locations are thus defined by the synchronization signals. Comparison circuitry responds to predetermined differences between this amplitude distribution profile in different frames. If the profile in one frame is sufficiently different from that of others, an alarm sounds.

The particulars and the advantages of the present invention will be understood in detail by reference to the description below and to the drawings, in which:

DESCRIPTION OF THE PREFERRED EMBODIMENT

Figure 1:
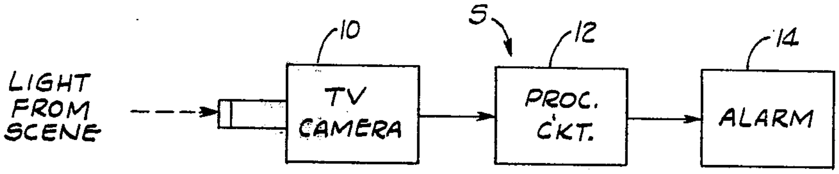
FIG. 1 is a block diagram illustrating an area monitoring system incorporating the present invention.

FIG. 1 illustrates in simple form an area monitoring system S incorporating the present invention. The major components of the system S include a television camera 10 for viewing a scene of interest, the scene emitting radiant energy, such as visible light. The television camera 10 converts the visible light to electrical signals, including an amplitude modulated analog video signal, describing the spatial distribution of light intensity about the scene. The electrical signals indicating light distribution are transmitted to processing circuitry 12 which compares light distribution of a previously viewed television image frame with the analogous information from subsequent image frames. In the event that sufficient difference exists between the respective spatial energy distributions of the previous and subsequent television image frames, the processing circuitry 12 produces an alarm signal which actuates an alarm producing system 14.

A system such as that illustrated in FIG. 1 can be used, for example, to view an area and indicate any intrusions or other untoward changes or conditions which might represent danger to personnel or damage to facilities or product.

Figure 2:
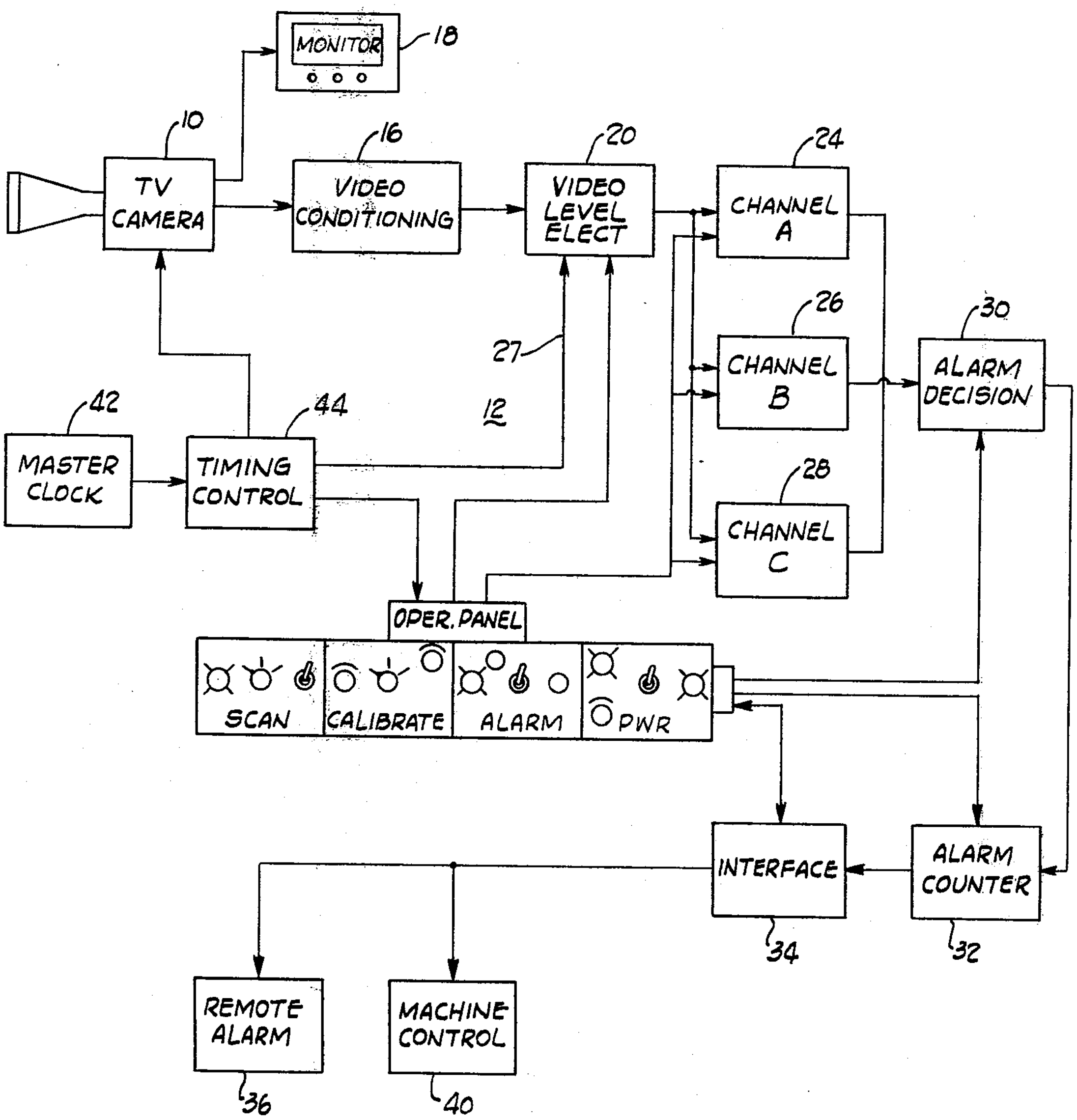
FIG. 2 is a block diagram illustrating the system of FIG. 1 in more detail.

The system of FIG. 1, particularly the processing circuitry 12, is illustrated in more detail in the block diagram of FIG. 2. The analog video signals produced by the television camera 10 are amplified by preamplifier circuitry included within video conditioning circuitry 16.

Optionally, the television camera 10 can also be connected to a television monitor 18 to produce a conventional television picture of the viewed image.

The amplitude of the amplitude modulated (A.M.) video signal is continually sampled for input to a multi-channel counter 24, 26, 28, (described in more detail below) of selected samples falling within respective amplitude ranges. The sampling is performed by video level selection circuitry 20 including comparators and steering decoding circuitry. As explained below, each sampled portion of the video signal causes a count signal to be input to that channel of the multi-channel counter which is allocated to a video amplitude range encompassing the sampled video signal amplitude.

The video sampling periods are defined by timing and master clocking circuitry 42, 44, also discussed in more detail below.

The video level select circuitry 20 is actuated by clock timing sampling pulses, appearing on a lead 27 (FIGS. 2 and 3) each of which defines a finite but small sampling point in the image raster generated by the television camera for each image frame.

In accordance with the preferred embodiment, each television image frame is sampled at 8,192 sampling points. There are, in that embodiment, 64 equally spaced sampling points per line, and only each fourth line in a field of 512 lines, or a total of 128 lines, is sampled. Optionally, the number of sampling points can be changed by an appropriate change in the frequency of the sampling clock pulses from the timing and clock circuitry 42, 44. The sampled image points are the same in each frame, due to their uniform time synchronization with the T.V. synch signals.

Each channel of the multi-channel counter corresponds to a predetermined video signal amplitude range. Count signals are produced in response to video samplings, and distributed among the several channels in accordance with the amplitude of each video signal sample in response to which each respective count signal is generated.

More specifically, each counter channel is incremented by one count in response to the occurrence of a sampled video amplitude representing an energy intensity of the sampled image point, which energy is within the respective energy range allocated for that channel.

For purposes of convenience, a three-channel counter is shown in FIG. 2, but it is to be understood that, within limits of practicality, any number of channels could be employed, and the video signal amplitude can be divided into a like number of corresponding energy ranges. The respective channels of the multi-channel counter are indicated by reference characters 24, 26, 28.

As described in more detail below, it is possible to have a workable system embodying this invention with only a single counter channel. In such an embodiment, a count is developed of only those video amplitude samples falling within a single range. Such a count method has been shown effective in evaluating light distribution of one frame, and comparing it to that of others.

In such a single channel embodiment, a multiplexer is provided in the video select circuitry for selectively transmitting to the single storage channel counter count signals representing only video samples falling within a preselected one of a set of video ranges defined by comparator circuitry.

Returning to the three-channel embodiment, each of the channels 24, 26, 28 includes counter circuitry, and latching circuitry operative in response to a strobe signal for storing counts accumulated in the respective counter channel at the time of strobing, which occurs at the conclusion of each image frame scan. In response to a reset signal, from the video level select circuitry 20, and timing circuitry 44 (discussed below) each of the counters of the channels 24, 26, 28 is reset to zero. Subsequently, sampling signals from the video level select circuitry 20 and timing circuitry cause the channels 24, 26, 28 to accumulate in their counter circuitry another set of counts, representing a video signal amplitude profile for a subsequent television image frame. The points at which the video signal is sampled in the subsequent television image frame are the same as those points sampled in the earlier sampled frame. Meanwhile, the profile accumulated by the respective channels and associated with the previous frame is stored by sample and hold circuitry, discussed in more detail below.

An alarm is actuated in response to the occurrence of a predetermined difference between the stored amplitude profile and a succession of profiles accumulated in the counters during a succession of subsequently monitored image frames. The alarm is actuated by alarm decision circuitry 30. The decision circuitry 30 senses the occurrence of predetermined difference between stored and subsequent amplitude profiles, and actuates alarm control circuitry 32 (including gating circuitry) in response to that difference being of a predetermined magnitude. The alarm control circuitry, in response to actuation by the alarm decision circuitry 30, produces a signal to alarm interfacing circuitry 34. Interfacing circuitry 34 in turn produces appropriate signals to actuate known types of alarm indicators, such as remote alarm circuitry 36 and machine control circuitry 40, e.g. relays. The remote alarm is suitably embodied by a visible or an audible alarm signal generator, such as a light or a buzzer.

Additionally, machine control circuitry 40, such as an electrically actuated solenoid, can be actuated in response to the occurrence of an alarm indicating signal to stop a machine in an industrial process, or otherwise control equipment operation to safeguard personnel, equipment or product.

Optionally, suitable additional control circuitry can be associated with the interfacing circuitry 34 in order to provide flexibility in the type and mode of operation of the respective alarm devices. The choices in this aspect are within ordinary skill.

Timing control circuitry is provided for controlling the sequence of operations of the present system. The timing control circuitry includes a master clock 42 and associated timing logic control circuitry 44.

Figure 3:
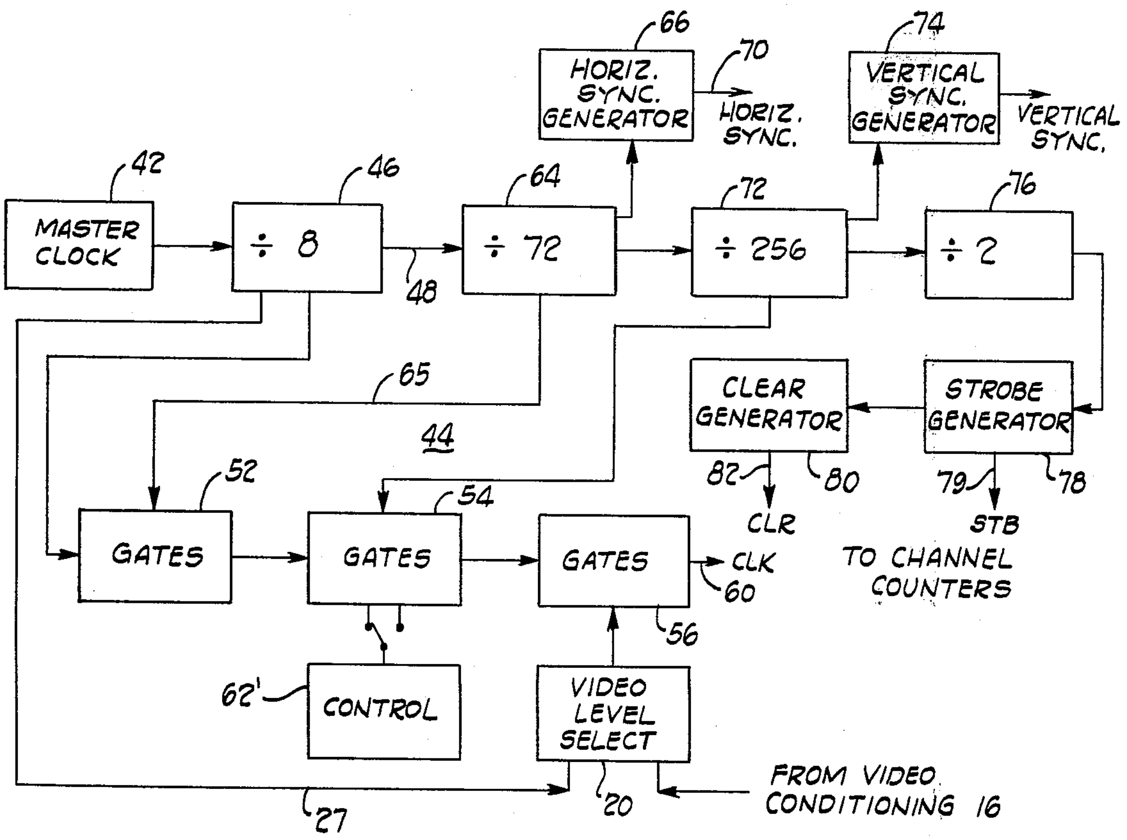
FIG. 3 is a block diagram illustrating a timing portion of the system shown in FIG. 2.

The master clock 42 and timing logic circuitry 44 are illustrated in more detail in FIG. 3. The master clock 42 is a crystal controlled clock unit. The master clock frequency is selected, within ordinary skill, to facilitate reliable and accurate sampling times, and to match the synchronization requirements of the television camera 10 and the channels 24, 26, 28 of the multi-channel counter circuitry.

A "divide by 8" circuit 46 receives an input from the master clock 42 and generates sampling count pulses over leads including 27, 48. The sampling count pulses are also supplied to the multi-channel counter circuit channels by way of gating circuitry of the timing control logic circuitry 44.

The output of the divide by 8 circuit 46 is directed to video level selection circuitry 20. Another output of the sampling count pulses is delivered to gating circuitry 52, 54, 56. The gating circuitry 52, 54, 56 produces a clocking output at a lead 60 which limits the image point sampling to only a predetermined number of lines of the image frame. An optional two position control circuitry 62, coupled to gate circuitry 54, selects the operation of the gating circuitry between a first state, in which only one out of every 4 lines is sampled, and a second state, in which one of every two raster lines is sampled.

The sampling count pulses transmitted over the lead 48 are directed to a "divide by 72" circuit 64. The dividing circuitry 64 produces the divided output of the sampling count pulses to a known type of horizontal synchronization generator 66 associated with the television camera 10. The horizontal synch generator 66 produces at a lead 70 the horizontal "synch" signals for the television camera.

The divided signal from the circuitry 64 provides a control signal on a lead 65 for effecting 8 sampling count pulses during which time the system does not sample, the 8 pulses allowing for return blanking, or horizontal flyback of the television system.

The output of the dividing circuitry 64 is provided as an input to a "divide by 256" circuit 72. One output of the dividing circuitry 72 is provided to known vertical synchronization generator circuitry 74, which in response produces vertical synchronization pulses for the television camera 10.

The dividing circuitry 72, by way of divide by 2 circuitry 76 and a strobe generator 78, actuates clearing generator circuitry 80 to provide a "clear" signal at an output lead 82 which is directed to the channels of the multi-channel counters and which serves to reset the counter circuitry of each channel on the occurrence of a signal at the lead 82, which occurs at the end of each frame.

The counter circuitry of the channels 24, 26 28, during each image frame, will accumulate a total number of counts, the total number corresponding to the total number of sampling points per frame. The counting circuitry of each channel, at the conclusion of scanning of the image frame, will contain a portion of this total count equal to the number of times the sampled video amplitude level was within the amplitude range allocated to that channel, as sensed by the video level select circuitry 20.

As explained above, in a complete frame, (for the present example) 8,192 discrete spaced image points are sampled. Thus, the total number of counts in all the channels at the conclusion of the scanning of one frame is 8,192.

Figure 4:
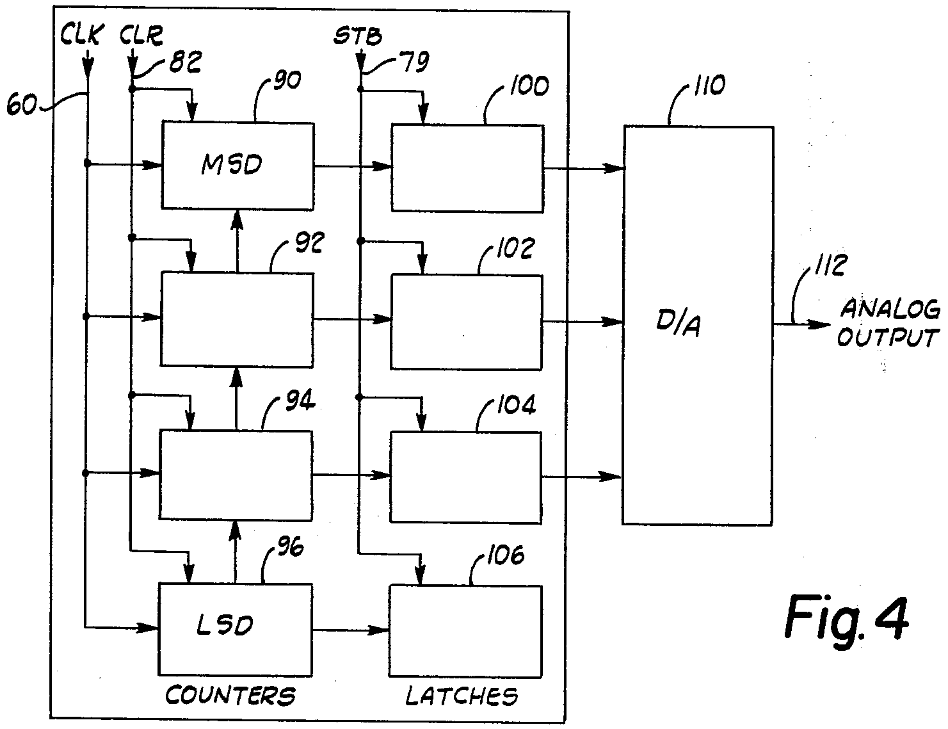
FIG. 4 is a block diagram illustrating a counter channel portion of the system shown in FIG. 2.
Figure 5:
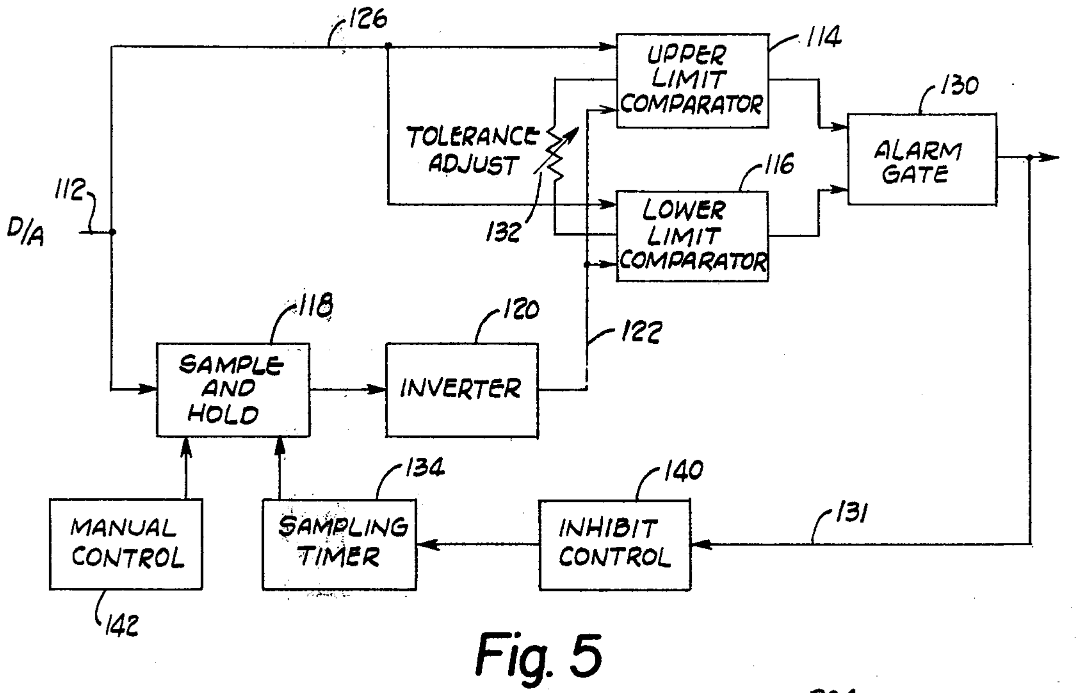
FIG. 5 is another block diagram illustrating comparison and alarm control portions of the system of FIG. 2.

Circuitry constituting an individual channel of the multi-channel counter and associated circuitry is illustrated in more detail in FIGS. 4 and 5.

Only one of the channels 24, 62, 28 is illustrated in detail in FIGS. 4 and 5. It is to be understood that all the channels 24, 26, 28 of the multi-channel counter are substantially identical to the embodiment illustrated in FIGS. 4 and 5.

Each of the channels includes a digital section and an analog section. The digital section of one of the channels is illustrated in FIG. 4.

The digital section of each channel includes four binary coded decimal (BCD) counters 90, 92, 94, 96. The digital section further includes a set of latches 100, 102, 104, 106, downstream from the BCD counter circuitry. The output of the latches are directed as inputs to a digital to analog converter 110. The digital to analog converter 110 produces at an output 112 an analog voltage which is a function of the total digital value input to the converter 110 from the set of latches.

At the end of each image frame scan, the count stored in the BCD counters of the channel is transferred to the latches in response to a strobe signal appearing on a lead 79. The BCD counters are then reset to zero by the "clear" pulse over the lead 82.

Referring to FIG. 5, the analog output of the digital to analog converter appearing on the lead 112 is transmitted to a set of two comparators 114, 116 and to sample and hold circuitry 118. The value held in the sample and hold circuitry is transmitted by way of an inverter 120 over a lead 122 to reference inputs of the comparators 114, 116.

In operation, the sample and hold circuitry 118 samples, stores and continuously delivers, as a reference to the comparators 114, 116, the analog count value stored during the most recent sampling period. The sampling periods are defined by occurrence of the signals from a sampling timer 134. The sampling timer defines a sequence of sampling periods. The analog value held in the sample and hold circuit thus represents the count accumulated in the associated channel during the most recent sampling period. The sampling circuit holds the stored count value until the next sampling period occurs, as determined by the sampling timer, at which time the value so held is updated, or refreshed, to represent an adjusted reference value, to compensate for electrical circuit drift, or small changes in the viewed scene which are of no interest.

By appropriate adjustment of the sampling timer, the time between sampling periods can be several image frames, or only one. Where a sampling period occurs with each frame, the stored reference value is updated for each frame, provided the value of count sensed for the frame does not deviate from the stored reference value (corresponding to the previous frame) by an amount sufficient to cause the comparators to indicate an alarm condition.

The sampling rate during the normal operation of the system, as described above, is controlled by the sampling timer 134. The sampling timer 134 functions only when an alarm condition, as indicated by a signal from the alarm gate 130, does not exist. When an alarm condition exists, the sampling timer is inhibited.

It is important to note that the reference count held in the sample and hold circuitry represents only a "normal" scene, to which no responsive alarm is desired. The updating occurs only to adjust for small changes within the scope of normalcy.

It is desirable, when an abnormal frame is detected, to cause the sample and hold circuitry 118 to continue to hold its stored normal prior reference count, relating to a prior frame, so that counts obtained in later frames may also be compared with the same stored normal prior reference value held in the sample and hold circuitry. Once a deviant frame is detected, one wishes to prevent the comparators from adopting the deviant abnormal value as a reference. Rather, it is desirable to "freeze" a normal reference value for the comparators.

Therefore, sampling inhibit control circuitry 140 is provided. The inhibit control circuitry 140 responds to the production of a signal by an alarm gate 130, indicating an abnormal frame, to inhibit the operation of the sampling timer 134, so that the reference count value presented by the sample and hold circuitry to the comparators remains unchanged.

More specifically, if the current image frame count value transmitted directly to the comparators is greater than the sampled and held value by a predetermined amount, comparator 114 actuates an alarm gate 130, which produces an alarm signal having effects discussed in more detail below. In the event that the current count value is less than the sampled and held value by a predetermined amount, the comparator 116 actuates the alarm gate 130 causing an alarm signal similar to that produced in response to the comparator 114.

An adjustable resistive element 132 is provided and coupled to the comparators 114, 116 to adjust the degree of tolerance "spread" or sensitivity of this set of two comparators to changes in count rate between frames. That is, the amount of change necessary to actuate one or the other of counter 114, 116 is adjustable by means of the resistive circuitry 132.

The output voltage from the digital to analog converter 110 can also be sampled manually by manual sampling control circuitry 142, after system warmup time, or at any time during system operation, to enable calibration. In such a calibration mode, the operator can view on command the value of the individual channel count for a given scene which he considers normal. This information can be utilized by the operator to set up desirable system operating parameters, such as comparator tolerance spread level desired.

Referring again to FIG. 2, the outputs of the alarm gates 130 of each of the channels 24, 26, 28 are connected to circuitry comprising alarm decision logic control circuitry 30. The output of the alarm logic decision circuitry 30 controls the reset input of the alarm counter 32.

If no alarm condition exists, the alarm counter 32 is inhibited. The clocking signal to the alarm counter 32 is the "clear" signal, the same signal which is used to reset the multi-channel counters at the end of each frame scan.

When an alarm condition exists, the alarm counter 32 will advance one count in response to the end of the frame scan during which the alarm condition is detected. If this alarm condition is still present when the next "clear" pulse occurs at the end of the next successive scan cycle, the alarm counter will advance an additional step.

A BCD to decimal decoder associated with the alarm counter allows the selection of any number from zero to nine. Selecting the number 3, for example, means that the alarm condition must persist for 3 consecutive scan cycles in order to trigger an actual alarm. This feature is designed to prevent a false alarm, such as might arise from an electrical transient or interference in the circuitry of the monitoring system, which might give rise to a spurious indication of scene change during, for example, only one or two frames.

Thus, an alarm condition is created by any interference with the normal scene under surveillance which causes a change in the output of any channel digital to analog converter which is greater than the level established by the preselected comparator tolerance setting of the element 132. Such a deviation causes the corresponding comparator to switch the gate 130 and remove the reset signal from the alarm counter, thus allowing the alarm counter to advance one step.

The selected output of the BCD to decimal decoder circuitry is connected to known alarm interface circuitry 34 for controlling one or more alarm devices, such as a flashing light on an operator's panel, an audible signal, or a remote control device. Such control devices can be used to stop a machine in response to a sensed scene change, to prevent damage to the machine, personnel, or product.

Optionally, an alarm reset circuit, connected to a push button on the operator's panel, can reset the alarm circuitry.

Figure 6:
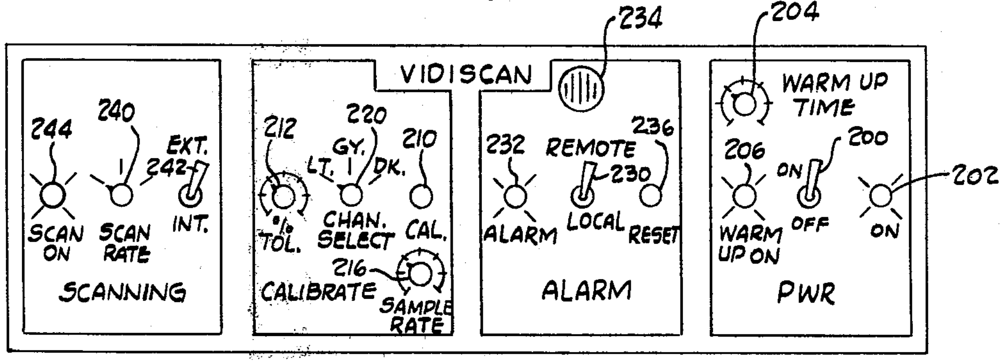
FIG. 6 is a graphical representation of a front control panel appropriate for the system of FIGS. 1 and 2.
Figure 7:
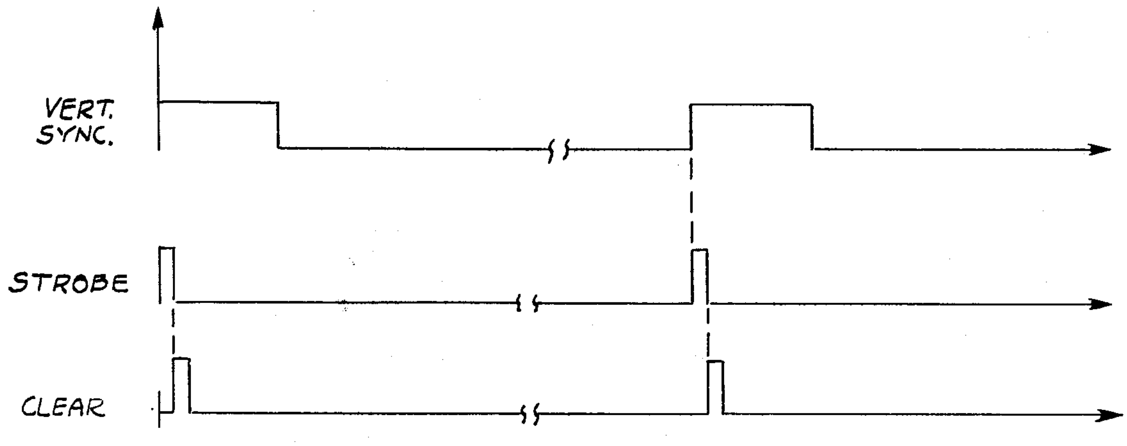
FIG. 7 is a timing chart illustrating time relation of signals produced within the system of FIG. 2.

The Operator's control panel for the monitoring systems of this invention is illustrated in FIG. 1, and in detail in FIG. 6. In a power section of the front panel, illustrated in the right-hand portion of FIG. 6, a main power off/on switch 200 is illustrated. An indicator lamp 202 provides a visual indication when the main power supply is on. A knob 204 enables the adjustment of a predetermined adjustable warmup time for the system. A lamp 206 becomes illuminated when the warmup time is complete, indicating to an operator when the system is ready for operation.

During the warmup time, the alarm circuitry is turned on. At the end of the warmup time, the warmup indicator lamp becomes illuminated, and normal system operation can take place after the operator views the scene under surveillance. If the monitored scene is in a satisfactory condition and the system properly set up, in the judgment of the operator, the operator may then switch to a calibrate mode of the system by depressing a calibrate button 210, and select which, channel is to be calibrated. The calibrate section of the front panel includes a tolerance adjustment knob 212 for adjusting the degree of tolerance spread of the comparators 114, 116 of the selected channel, as discussed in detail above. A sample rate (sample timer) control 216 is coupled to adjust the sampling rate of the sample and hold circuitry 118 for a predetermined channel, also described above. The channel governed by the controls 212 and 216 is determined by the setting on a channel selection knob 220. This section of the system enables the individual calibration of parameters of each channel.

Figure 8:
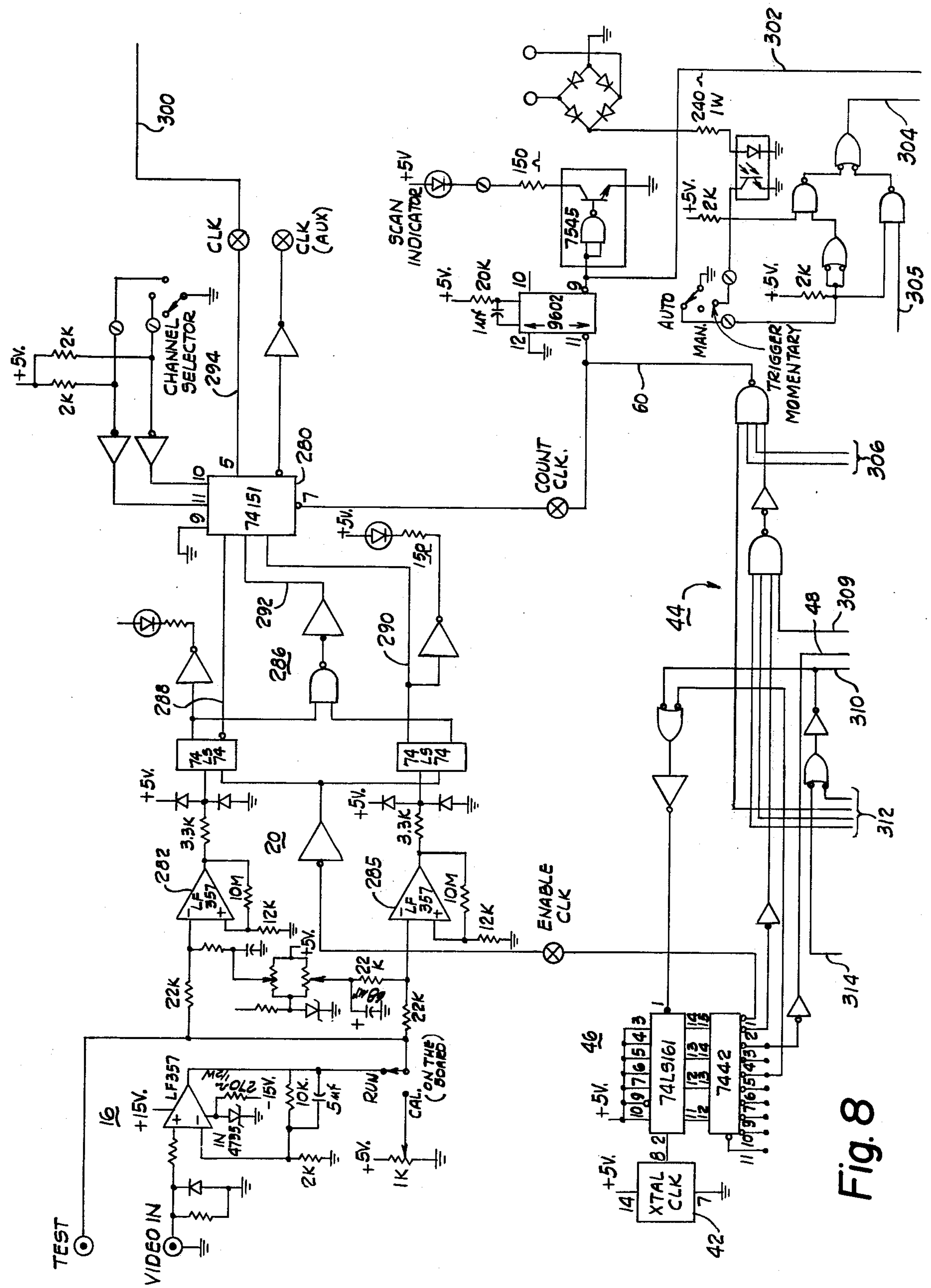
FIGS. 8, 9 and 10 are schematic drawings illustrating portions of the system of FIG. 2.

When the calibrate button 210 is depressed, it causes the sample and hold circuitry 118 to sample and hold the output of the digital to analog converter 110 for the selected channel. This button 210 should be operated only when the desired normal scene to be monitored is viewed by the television camera, clear of interference.

Where the embodiment of this invention is used employing only a single channel counter and a multiplexer is used, a particular setup procedure is recommended. Referring to FIG. 8, the multiplexer is designated by reference character 280. The multiplexer 280 is connected between video level selection circuit 20 and the counter circuitry 90, 92, 94, 96. In the illustrated embodiment, comparator circuitry 282, 285 of the video level selection circuitry 20, in combination with downstream gating circuitry generally indicated at 286, indicates which of three video level ranges is represented by each sampled video signal portion by producing a pulse at one of three output leads 288, 290, 292.

If the video signal is above a predetermined relatively high light level, a signal is produced on the lead 288. If a video signal is below a predetermined relatively low video level, a signal is produced on the lead 290. If the sample video level is between the relatively high and relatively low level, a signal is produced at the lead 292. The leads 288, 290, 292 are all presented as input to the multiplexer 280.

The multiplexer transmits to an output lead 294 pulses incoming on one of the leads 288, 290, 292, depending on the state of other input signals to the multiplexer 280. Thus, the multiplexer 280 is utilized to select for transmission to the counter circuitry only those video signals representing sampled video levels falling within one of the three predetermined ranges.

In setting up the system of this invention for operation, utilizing the multiplexer and single channel counter, it has been found desirable to set up the multiplexer to facilitate counting of video samples for the video range encompassing the largest number of sample counts in the "normal" scene. To accomplish this, an operator simply samples the number of video sample counts in each video range and tunes the multiplexer to transmit video sample counts only in the range having the highest number of sample counts in the normal scene.

Referring again to FIG. 6, an alarm control system includes a toggle 230 which is used to select between local and remote alarm devices. An alarm lamp 232 is coupled to alarm circuitry as described above such that the lamp 232 is illuminated in response to an alarm condition. An audible alarm, such as a buzzer or horn 234, can also be provided. An alarm reset button 236, when depressed, resets all the alarm functions of the system, in preparation for the occurrence of a future alarm condition.

A scanning control portion of the operator's panel includes a scanning rate control knob 240. A selector toggle 242 is provided to enable the operator to choose between internal and external scanning control. An indicator light 244 is provided which is illuminated each time a scanning cycle is initiated by external triggering circuitry.

Figure 9:
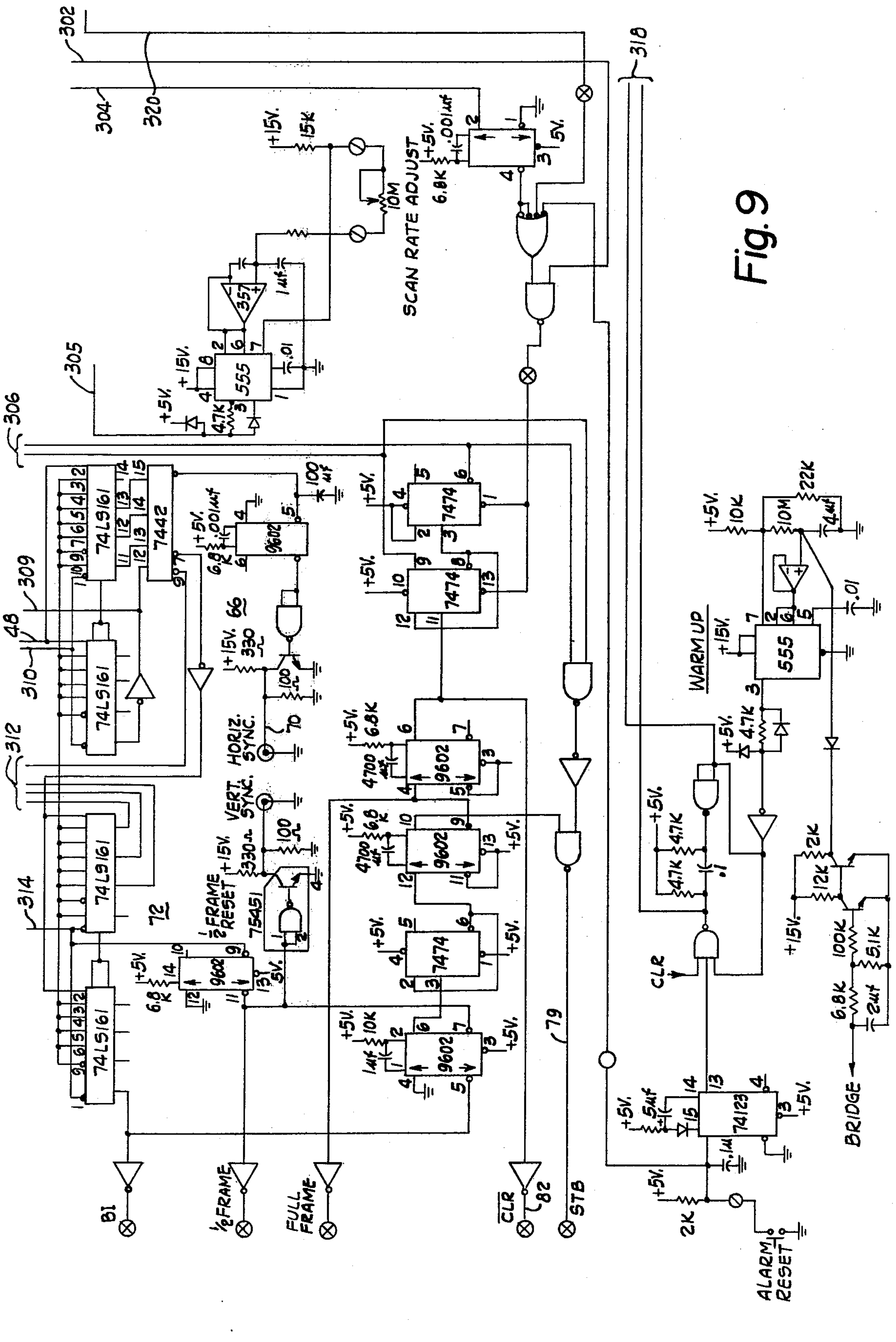
Figure 10:
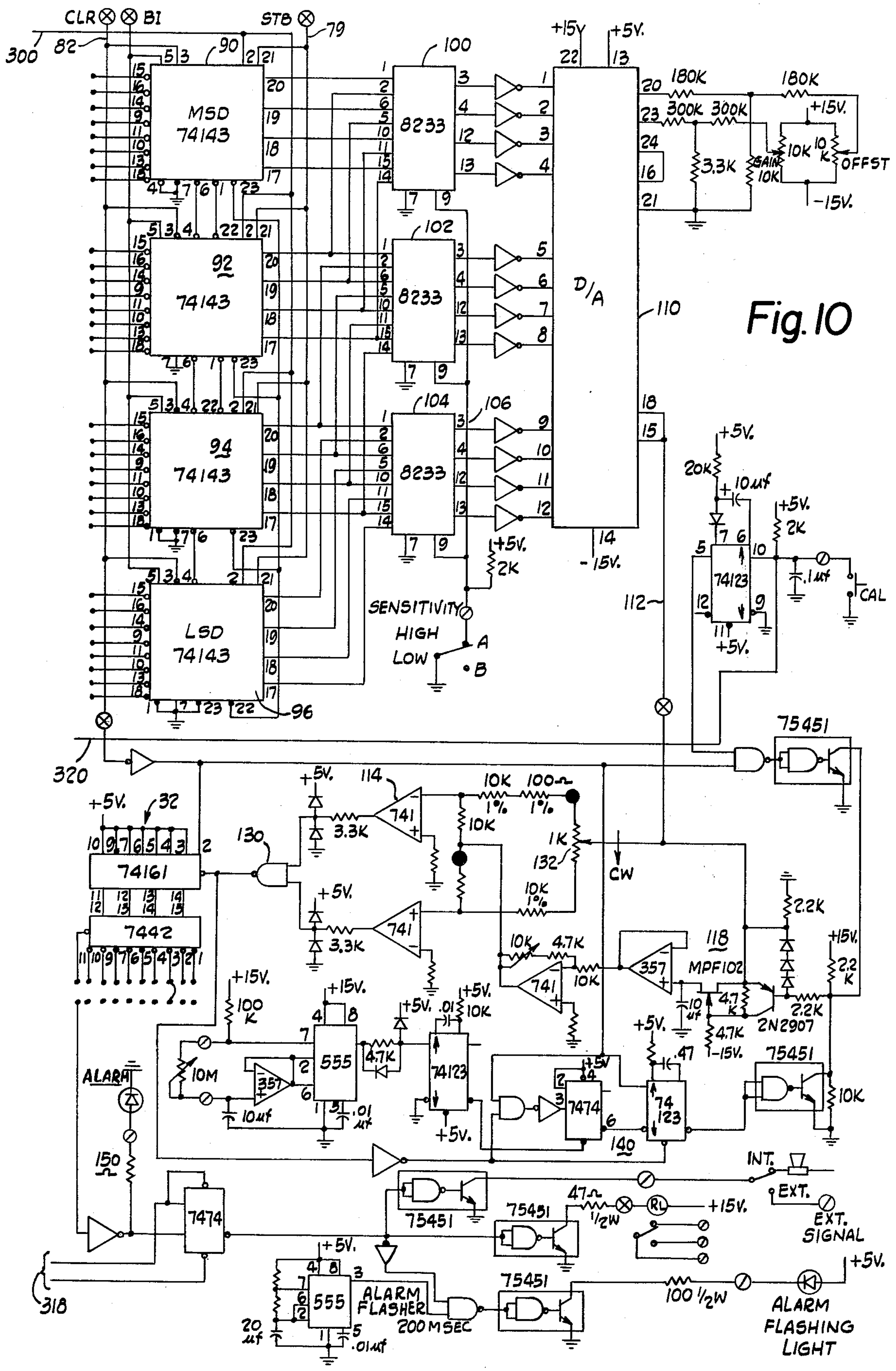

For the benefit of those not intimately familiar with this art, FIGS. 8–10 are provided, which conjunctively illustrate specific circuitry for implementing the present invention, augmented with reference characters correlating between FIGS. 8–10 and the other FIGURES.

It is to be understood that the disclosure of this invention is intended to be illustrative, rather than exhaustive, of the invention. It should be realized that those of ordinary skill may make certain modifications, deletions, or additions with respect to the disclosed subject matter without departing from the spirit of the invention, or from its scope, as defined by the following claims.

What is claimed is:

1. A system for sensing changes in distribution of energy emanating from a scene, said system comprising:
(a) pickup means for converting the energy to electrical signals representing intensity distribution of said emanation from the scene;
(b) circuitry cooperative with the pickup means for sampling energy intensity of each of a predetermined set of locations of the scene;
(c) circuitry for accumulating during a sampling period a count of the number of said sampled locations which emanate energy within a predetermined intensity range, said count being produced independently of the relative spatial positions within the scene of the sampled locations, and
(d) comparison circuitry for detecting at least a predetermined difference between the value of said count and a predetermined value.

2. The system of claim 1, further comprising:
(a) said counting circuitry comprising a multi-channel counter and associated circuitry for counting the numbers of said sampled locations whose emanated energy intensities lie respectively within each of a plurality of different ranges;
(b) circuitry for resetting said multiple counting channels after a prior sampling period;
(c) a memory for storing count information derived during said prior sampling period for comparison with count information derived during a subsequent sampling period, and
(d) circuitry for actuating said sampling and counting circuitry during said subsequent sampling period to resample the energy intensities at said same set of locations in the scene.

3. The system of claim 2, wherein said comparison circuitry comprises means for indicating at least a predetermined degree of change in the count accumulations in any of a plurality of channels of the multi-channel counter between said prior and subsequent sampling periods.

4. The system of claim 1, further comprising:
apparatus coupled to the comparison circuitry for producing an alarm signal in response to the detection of said predetermined difference.

5. The system of claim 1, wherein:
(a) said pickup means comprises a television camera pickup tube and circuitry for operating the pickup tube of the camera to scan the scene in a series of frames, and
(b) said comparison circuitry comprises circuitry for producing an indication in response to changes in said counted number of locations between a prior frame and a subsequent frame.

6. The system of claim 1, wherein:

(a) said pickup means and sampling circuitry comprise a television camera pickup tube and video processing circuitry, said video processing circuitry producing horizontal and vertical synchronization pulses and associated control signals for causing the television camera pickup tube to scan the scene in a rectilinear fashion, and (b) said sampling circuitry further includes clocking and gating circuitry for defining said sampled locations of the scene as a function of timing of said synchronization signals.

7. The system of claim 6, wherein:

said video processing circuitry includes means for triggering said clocking circuitry to subdivide said television image to define said locations as a function of the time of coincidence of a vertical and a horizontal television synchronization signal.

8. An area surveillance system comprising:

(a) video pickup apparatus for producing a frame of information describing energy emanating from the area;

(b) processing circuitry for defining a set of predetermined locations in the frame;

(c) circuitry for sensing the emanated energy level of each of the locations;

(d) circuitry for summing the numbers of frame portions having an energy level lying within each of a plurality of predetermined range, independent of the relative spatial locations of the members of the location set;

(e) means for producing a reference signal describing a reference number, and (f) comparison circuitry for producing an alarm signal in response to a predetermined relationship between the reference signal and the number of portions summed in the counter.

9. A system for monitoring changes in a scene from which radiant energy emanates, said system comprising:

(a) a television camera including control circuitry for producing horizontal and vertical synchronization signals for causing the television camera to scan at least a portion of the scene in repeated rectilinear frames, to produce a video signal indicating energy level distribution of each frame;

(b) clocking circuitry for defining sampling times during which the television camera scans each of a same predetermined set of sampling locations of each frame;

(c) multi-channel accumulating count circuitry, and (d) circuitry responsive to the clocking circuitry and the video signal for steering a representation of the value of the video signal at each sampling location into a channel of the multi-channel counting circuitry, the selection of the channel to which each video representation is steered being a function of value of the video signal at its respective sampling time.

10. The system of claim 9, further comprising:

means associated with the steering circuitry for preventing each sampled video value representation from affecting any channel of the multi-channel circuitry but that channel to which that representation is steered.

11. A method for sensing changes in distribution of energy emanating from a scene, comprising the steps of:

(a) converting energy from the scene to electrical signals representing spatial intensity distribution of the energy;

(b) sampling energy intensity of each of a predetermined set of locations of the scene;

(c) accumulating during a sampling period a count of the number of said sampled locations from which energy emanates within a predetermined intensity range, said accumulation step being performed independently of relative spatial positions within the scene of the sampled locations, and (d) detecting the existence of at least a predetermined difference between the value of the count accumulated in the previous step and a predetermined value.

12. The method of claim 11, wherein:

(a) said accumulation step comprises counting the numbers of said sampled locations whose emanated energy intensities lie respectively within each of a plurality of different ranges, said method further comprising:

(b) storing count information derived during said sampling step;

(c) repeating said sampling step, and (d) comparing the counts obtained in the sampling step with those obtained in the repeated sampling step, and (e) detecting predetermined differences in corresponding counts obtained in the two sampling steps.

13. The method of claim 11, further comprising the step of:

producing an alarm signal in response to the detection of said predetermined difference.

14. The method of claim 11, wherein:

(a) said converting step includes operating a pickup tube of a television camera to scan the scene in a series of frames, and (b) said detection step comprises producing an indication in response to changes in said counted number of locations between a prior frame and a subsequent frame.

15. The method of claim 11, wherein said conversion and sampling steps comprise:

(a) producing horizontal and vertical synchronization pulses for controlling a television camera pickup tube to scan the scene in a rectilinear fashion, and (b) said sampling step further includes clocking and gating operations for defining the sampled location of the scene as related to the synchronization signals.

16. The method of claim 15, wherein:

said defining step comprises defining the locations in response to the coincidence of vertical and horizontal television synchronization signals.

17. An area surveillance method comprising:

(a) producing a frame of information describing energy emanating from the area;

(b) defining a set of predetermined locations in the frame;

(c) sensing the emanating energy level of each of the locations;

(d) summing the numbers of frame locations having an energy level lying within each of a plurality of predetermined ranges, said summing step taking place independently of the relative spatial positions of the members of the location set;

(e) producing a reference signal describing a reference number, and (f) producing an alarm signal in response to a predetermined relationship between the number represented by the reference signal and a number of locations summed in the summing step.

18. A method for monitoring changes in a scene from which radiant energy emanates the method comprising the steps of:

(a) producing horizontal and vertical synchronization signals for causing a television camera to scan at least a portion of the scene in repeated rectilinear frames to produce an amplitude modulated video signal indicating spatial energy intensity distribution within each frame;

(b) triggering clocking circuitry to define a set of sampling times during which the television camera scans each of a same predetermined set of sampling locations of each frame;

(c) responding to the clocking and to the video signal for steering a representation of the value of the video signal at each sampled location into one of a plurality of storage channels, the selection of the storage channel being a function of the value of the video signal at its respective sampling time.

19. An area monitoring system comprising:

(a) a television system for viewing a scene of the area and representing the spatial distribution of electromagnetic radiation emanating from the scene by producing electrical signals including video and synchronization signals and defining a sequence of raster formated frames;

(b) circuitry for effecting real time sampling of video signal value at each of a set of locations of the frame raster during a first;

(c) sorting circuitry for developing in real time an amplitude distribution profile of the video signal samples;

(d) a memory system for storing a representation of the amplitude profile;

(e) circuitry for actuating the sampling and sorting circuitry to repeat their operation over a second frame for the same set of raster locations, and (f) comparison circuitry for producing an indication in response to the occurrence of a predetermined difference between the amplitude distribution profiles of the first and second frames.

20. The system of claim 19, further comprising:

circuitry for modifying the predetermined amplitude profile difference which causes the production of the indication by the comparison circuitry.

21. A system for monitoring changes in a characteristic of energy emanating from a scene, said system comprising:

(a) pickup means for converting the energy to electrical signals representing the measured characteristic;

(b) circuitry cooperative with the pickup means for sampling the measured characteristic at each of a predetermined set of locations of the scene;

(c) circuitry for accumulating during a defined sampling period a count of the number of said sampled locations the measured characteristic of whose energy lies within the scene of the sampled locations, and (d) comparison circuitry for detecting at least a predetermined difference between the value of said count and a predetermined value.

22. A video monitoring system comprising:

(a) a television system for viewing an area;

(b) circuitry cooperating with the television system for electrically defining a predetermined set of locations of the viewed scene;

(c) accumulation circuitry coupled to the television system for producing an exclusively scalar count of the number of sampled locations at which the energy has a characteristic lying within a predetermined range, and (d) comparison circuitry for producing an indication when the said count for a particular sampling period differs from a reference count by a predetermined threshhold value.

23. An area surveillance system comprising:

(a) pickup means for producing electrical information representing spatial energy distribution emanating from a scene, said representations being produced in a series of timed cycles;

(b) means for producing a series of information ensembles describing energy emanating from sampled points within the scene, the ensemble corresponding to a first cycle constituting a reference signal;

(c) means for comparing the reference signal with an analogous signal produced in a subsequent cycle, and (d) means for periodically refreshing the reference signal.

* * * * *